United States Patent
Lin et al.

(10) Patent No.: US 11,250,153 B2
(45) Date of Patent: Feb. 15, 2022

(54) TECHNIQUES FOR DETECTING PUBLISHING OF A PRIVATE LINK

(71) Applicant: Microsoft Technology Licensing, LLC, Redmond, WA (US)

(72) Inventors: Eugene S. Lin, Seattle, WA (US); Stephen Lincoln Rice, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 16/563,617

(22) Filed: Sep. 6, 2019

(65) Prior Publication Data

US 2021/0073408 A1    Mar. 11, 2021

(51) Int. Cl.
*G06F 16/955* (2019.01)
*G06F 21/62* (2013.01)
*G06F 16/958* (2019.01)
*G06F 16/9535* (2019.01)

(52) U.S. Cl.
CPC ........ *G06F 21/6227* (2013.01); *G06F 16/958* (2019.01); *G06F 16/9535* (2019.01); *G06F 16/9566* (2019.01)

(58) Field of Classification Search
CPC ............. G06F 16/9535; G06F 16/9566; G06F 16/958; G06F 16/168; G06F 16/16; G06F 16/487; G06F 16/907; G06F 21/6227; G06F 21/6209; G06F 3/0488; G06F 40/134; G06F 9/44505; G06K 9/6218; G06Q 10/063112; H04L 63/1416
See application file for complete search history.

(56) References Cited

U.S. PATENT DOCUMENTS

| | | | |
|---|---|---|---|
| 6,947,557 B1 | 9/2005 | Megiddo et al. | |
| 7,194,531 B2 | 3/2007 | Donker et al. | |
| 9,626,340 B2 | 4/2017 | Kirigin | |
| 2009/0100126 A1 | 4/2009 | Ferlitsch et al. | |
| 2014/0165153 A1 | 6/2014 | Dabbiere et al. | |
| 2014/0215551 A1 | 7/2014 | Allain et al. | |
| 2014/0337696 A1* | 11/2014 | Liu | G06F 40/134 715/205 |

(Continued)

OTHER PUBLICATIONS

"SharedCount", Retrieved from: https://web.archive.org/web/20190704175308/https:/www.sharedcount.com/, Jul. 4, 2019, 10 Pages.

(Continued)

*Primary Examiner* — Le H Luu
(74) *Attorney, Agent, or Firm* — Arent Fox LLP (57) ABSTRACT

Examples described herein generally relate to detecting publication of private links. A list of one or more links created for providing remote access to one or more files can be obtained, where the one or more links can be of a universal resource locator (URL) format. A web search for at least a portion of the URL format of the one or more links can be performed. Results of the web search can be analyzed to determine whether at least the portion of the URL format of the one or more links is located. Where at least the portion of the URL format of the one or more links is located in the web search, a report indicating that the one or more links are located in the web search can be generated and/or the one or more links can be at least temporarily deactivated.

20 Claims, 3 Drawing Sheets

(56) References Cited

U.S. PATENT DOCUMENTS

| | | | | |
|---|---|---|---|---|
| 2015/0006596 | A1* | 1/2015 | Fukui | G06F 16/16 |
| | | | | 707/831 |
| 2016/0041981 | A1* | 2/2016 | Ben Zvi | G06F 16/9535 |
| | | | | 707/770 |
| 2016/0072739 | A1* | 3/2016 | He | G06F 16/487 |
| | | | | 709/206 |
| 2016/0156576 | A1 | 6/2016 | Jeng et al. | |
| 2016/0323400 | A1* | 11/2016 | Rusinov | G06F 21/6209 |
| 2017/0091214 | A1* | 3/2017 | Kasterstein | G06F 16/168 |
| 2018/0013794 | A1 | 1/2018 | Esary et al. | |
| 2018/0131765 | A1* | 5/2018 | Puleston | G06F 16/907 |
| 2018/0191778 | A1* | 7/2018 | Volkov | H04L 63/1416 |
| 2018/0268253 | A1* | 9/2018 | Hoffman | G06K 9/6218 |
| 2019/0340554 | A1* | 11/2019 | Dotan-Cohen | |
| | | | | G06Q 10/063112 |
| 2020/0026528 | A1* | 1/2020 | Bhattathiri | G06F 9/44505 |
| 2020/0076747 | A1* | 3/2020 | DeMattei | G06F 3/0488 |

OTHER PUBLICATIONS

"Use PHP To Check Whether Remote URL, Email Or Image Link Exist", Retrieved from: https://web.archive.org/web/20160123150054/http:/hungred.com/how-to/php-check-remote-email-url-image-link-exist/, Jan. 23, 2016, 16 Pages.

"Running Reports—Box", Retrieved from: https://web.archive.org/web/20190330205732/https:/community.box.com/t5/How-to-Guides-for-Admins/Running-Reports/ta-p/26790, Mar. 30, 2019, 21 Pages.

Schallhorn, Kristin, "Announcing: No More Lost Share Counts After Switching to HTTPS", Retrieved from: https://www.addthis.com/blog/2018/08/17/no-more-lost-share-counts-after-switching-to-https/#.XTVtyvlzZeM, Aug. 17, 2018, 6 Pages.

"International Search Report and Written Opinion Issued in PCT Application No. PCT/US20/038008", dated Sep. 15, 2020, 11 Pages.

\* cited by examiner

TECHNIQUES FOR DETECTING PUBLISHING OF A PRIVATE LINK

BACKGROUND

Use of computing devices is becoming more ubiquitous by the day. Individuals use computers for communicating with one another through applications including productivity applications, which can include electronic mail features. Some communications can be content sensitive and may include links (e.g., in the form of universal resource locators (URLs)) to private files intended only for viewing by the recipient of the communications. Through use of enterprise applications, in one example, these links may be created within an organization for accessing files stored within or otherwise associated with a network of the organization. As computing devices continue to move to cloud storage where content can be stored on various nodes throughout the Internet, there may be risks associated with the links to private files being compromised by unauthorized individuals.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for detecting published links is provided. The method includes obtaining a list of one or more links created for providing access to one or more files in a cloud storage, wherein the one or more links are of a universal resource locator (URL) format, performing a web search for at least a portion of the URL format of the one or more links, analyzing results of the web search to determine whether at least the portion of the URL format of the one or more links is located, and where at least the portion of the URL format of the one or more links is located in the web search, generating a report indicating that the one or more links are located in the web search.

In another example, a computing device for detecting published links is provided. The computing device includes a memory storing a list of one or more links created for providing access to one or more files in a cloud storage, wherein the one or more links are of a URL format, and at least one processor coupled to the memory. The at least one processor is configured to obtain the list of one or more links, perform a web search for at least a portion of the URL format of the one or more links, analyze results of the web search to determine whether at least the portion of the URL format of the one or more links is located, and where at least the portion of the URL format of the one or more links is located in the web search, generate a report indicating that the one or more links are located in the web search.

In another example, a computer-readable medium is provided code including executable by one or more processors for detecting published links. The code includes code for obtaining a list of one or more links created for providing access to one or more files in a cloud storage, wherein the one or more links are of a URL format, performing a web search for at least a portion of the URL format of the one or more links, analyzing results of the web search to determine whether at least the portion of the URL format of the one or more links is located, and where at least the portion of the URL format of the one or more links is located in the web search, generating a report indicating that the one or more links are located in the web search.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to detecting publishing of private file links in content on the Internet, or more specifically the World Wide Web (WWW). For example, the file links can correspond to files (e.g., documents or other types of files) stored on a computer or one or more distributed computers in cloud storage. For example, a web search of the WWW can be executed on a search engine and using a query string that includes at least a portion of a link for one or more private files. The link may be of a universal resource locator (URL) format, and may include hypertext transport protocol (HTTP) links. If web search results are returned that include the link (e.g., WWW content that includes the link), this may be an indication that the private link is published on the WWW. In this example, a report can be generated to an administrator of an organization to which the link relates indicating that the link is located on the WWW, and the administrator can take remedial action if desired.

In an example, a cloud storage application can be used to store files and generate the links to the files for sharing with other users (e.g., via electronic mail or other productivity applications). In this regard, the cloud storage application may store a list of links that are created and can differentiate lists of links by user account that created the links, by organization of user accounts that created the links, etc. The cloud storage application, or another application that can receive the lists of links, can execute the web search to determine whether any of the links in one or more lists are located within WWW content, and can accordingly generate a report of detected published links. This can be performed periodically, e.g., based on a detected event, or on-demand, etc. The report can be sent to the user (e.g., for a list of links created by a certain user) or to an administrator associated with an organization (e.g., for a list of links created by various users of the organization), and/or the like. In addition, in an example, located links may be at least temporarily disabled and/or the report may include remedial action options, such as to deactivate the link, reactivate a deactivated link, send a newly generated link to the file, etc.

In this regard, published links to private files can be identified and reported to potentially prevent unauthorized accessing of the private files or otherwise make an administrator aware of the possible security threat to the private files.

Figure 1:
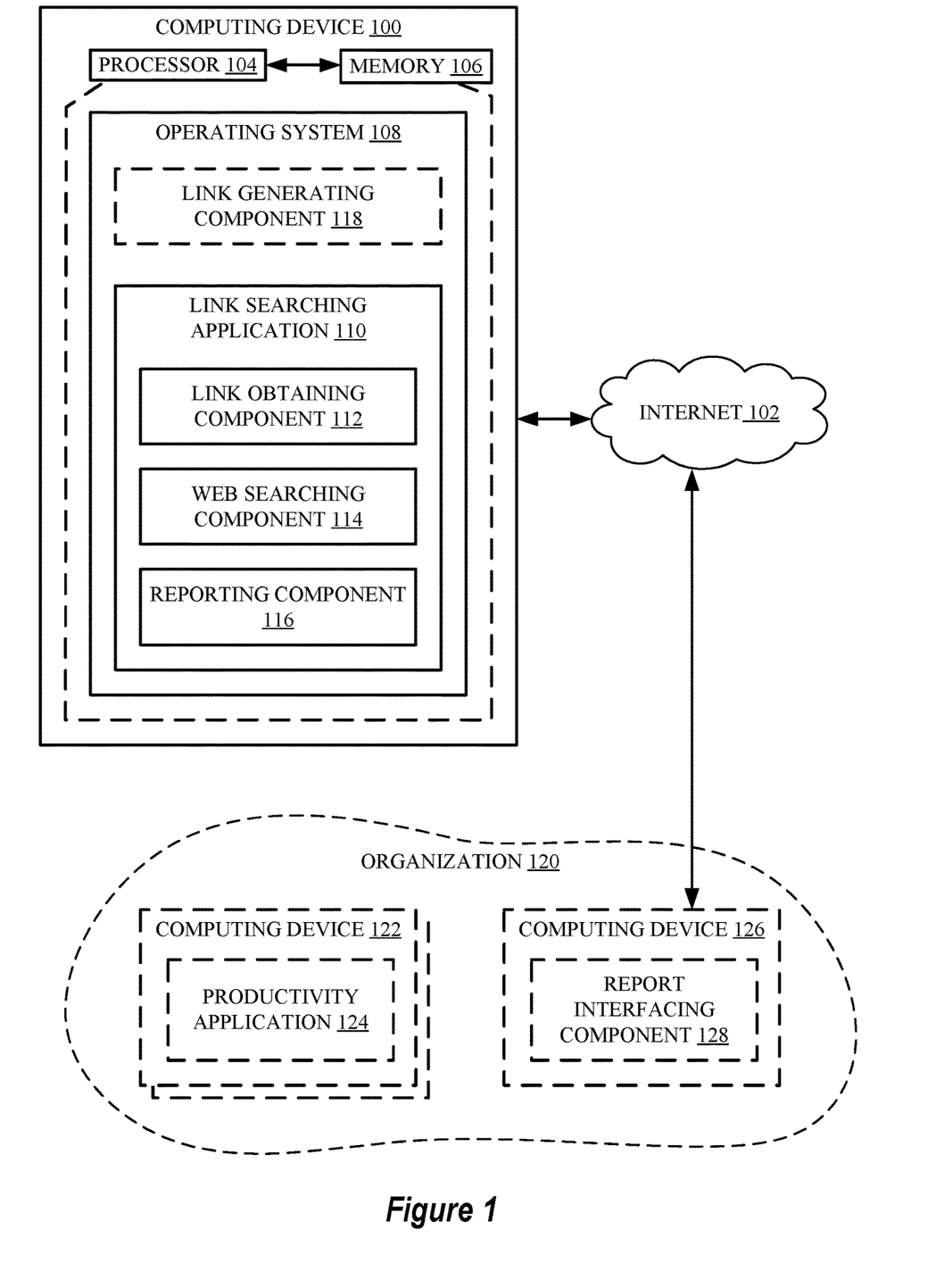
FIG. 1 is a schematic diagram of an example of a computing device for detecting publication of private links in accordance with examples described herein.
Figure 2:
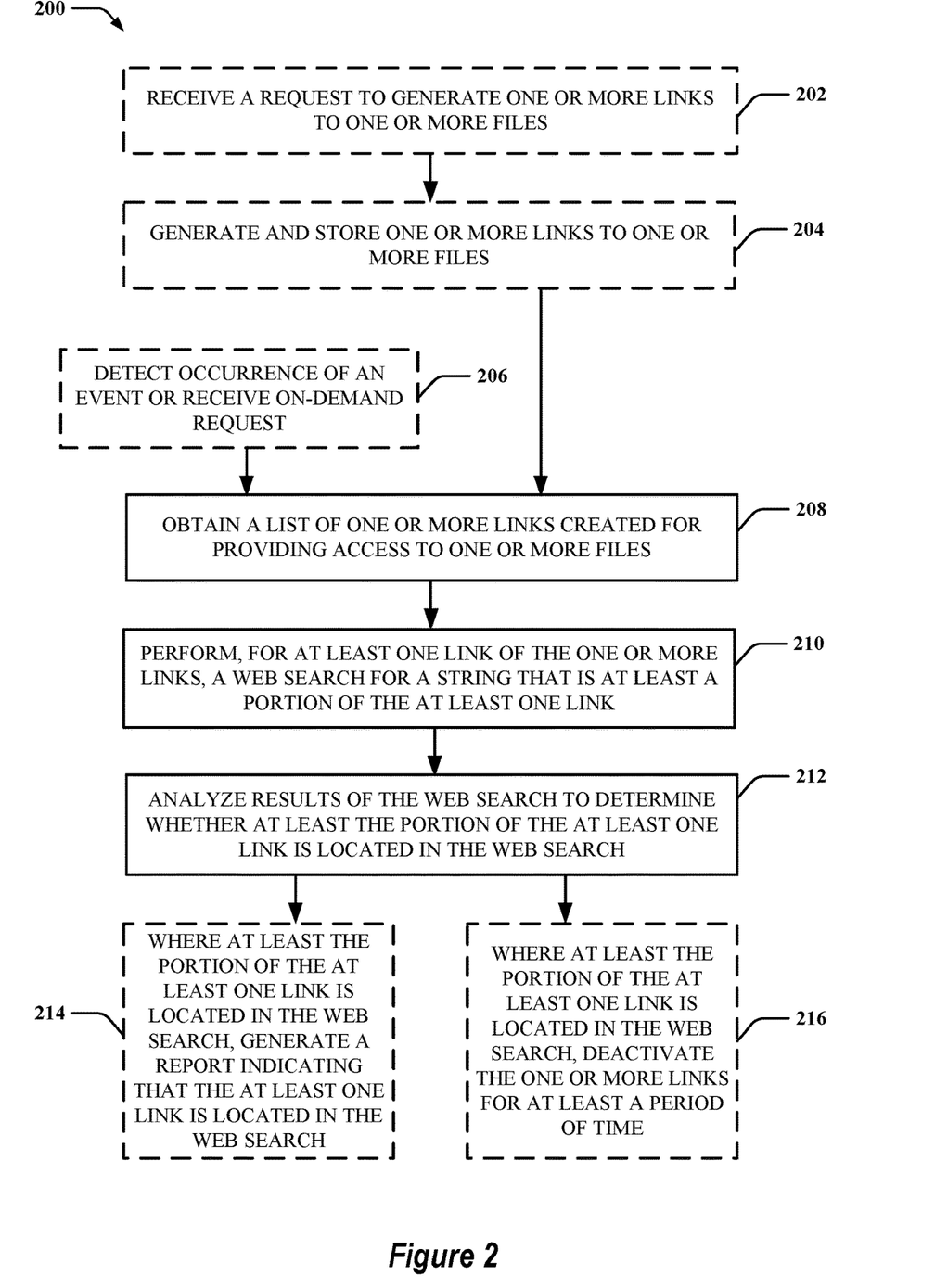
FIG. 2 is a flow diagram of an example of detecting publication of private links in accordance with examples described herein.
Figure 3:
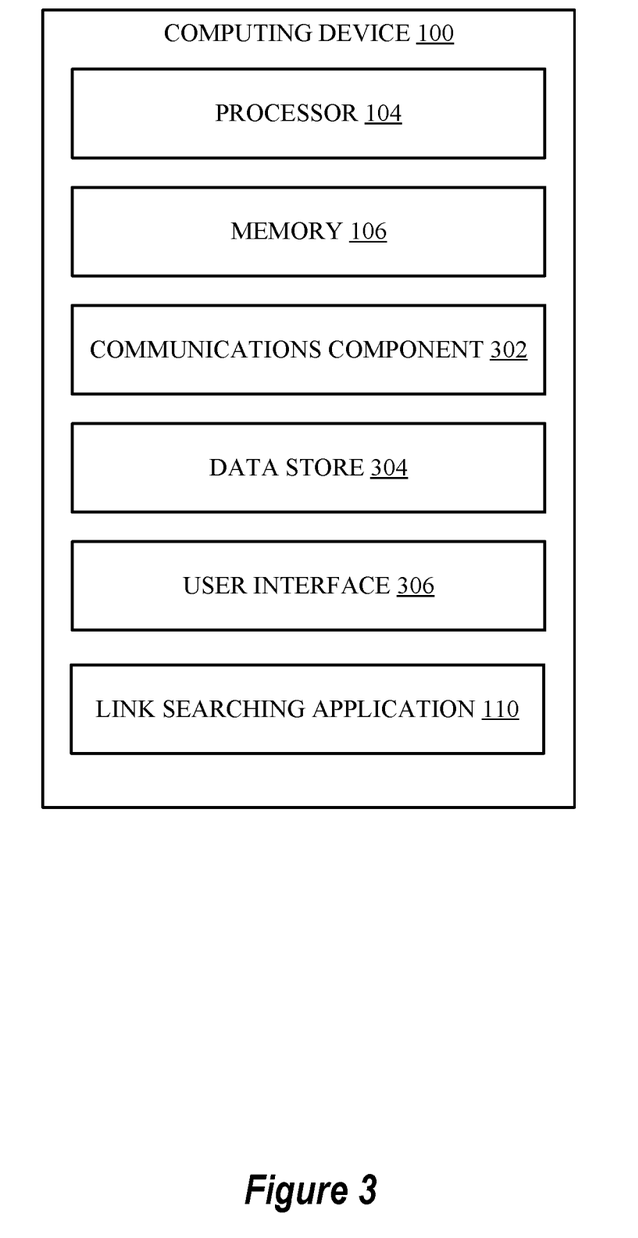
FIG. 3 is a schematic diagram of an example of a computing device for performing functions described herein.

Turning now to FIGS. 1-3, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for searching an Internet 102 (e.g., a network of computers, such as or including the WWW) for publication of private links in accordance with aspects described herein. Searching the internet 102 can be referred to herein as a web search, and may include executing a WWW search engine with a query string to obtain a set of results. In an example, computing device 100 can include or can otherwise be coupled with a processor 104 and/or memory 106, where the processor 104 and/or memory 106 can be configured to execute or store instructions or other parameters related to searching for private links, as described herein. Computing device 100 can execute an operating system 108 (e.g., via processor 104 and/or memory 106) for providing an environment for executing one or more applications. In one example, the operating system 108 can execute a link searching application 110 configured to execute a web search for at least a portion of a link text (e.g., a portion of text of a URL) to determine whether the link is found on the Internet 102 (e.g., on the WWW) via the web search.

In an example, link searching application 110 can include a link obtaining component 112 for obtaining a list of one or more links to search, a web searching component 114 to execute the web search to search for the one or more links, and/or a reporting component 116 for reporting results of the web search or other information related to one or more links located in the web search. Computing device 100 (or another computing device) can provide storage of documents (e.g., cloud storage over one or more distributed computing devices) and/or storage of links to the documents. In an example, operating system 108 (or another operating system on another computing device with which computing device 100 can communicate) can include a link generating component 118 for generating one or more links to one or more documents (e.g., documents in cloud storage). In an example, link searching application 110 can search the Internet 102 for one or more links generated by the link generating component.

In an example, an organization 120 can include many computing devices 122, 126 that can be coupled via one or more networks and/or the Internet 102. Computing device(s) 122 can include productivity application(s) 124 for creating and/or modifying files (e.g., documents or other files) for storing in cloud storage (e.g., via computing device 100 or other computing devices). In addition, productivity application 124 can allow for requesting a private link to a file, which productivity application 124 can fulfill based at least in part on requesting the link to the file from computing device 100 (e.g., via one or more other devices in the organization 120 that can communicate with computing device 100). In this example, link generating component 118 can generate the link to the file and can provide the link to the productivity application 124 to allow for embedding the link in communications (e.g., in electronic mail). In this example, link generating component 118 can add the link to a list of links to search on the Internet 102 for organization 120. For example, the link may be a URL, such as an HTTP URL (e.g., "https://my.sharepoint.com/:w:/g/personal/b5fEpAzB3g?e=i3XF").

For example, a user may use the productivity application 124 to send the link (e.g., the URL) in communications to another user (e.g., via electronic mail). The other user can receive the communication via another instance of the productivity application 124 (e.g., within organization 120 or otherwise). The other user can use the link to access the file. It may be possible, however, that the link becomes known outside of the organization. For example, the recipient may knowingly or unknowingly forward the electronic mail with the link to another recipient that is outside of the organization 120, or knowingly or unknowingly display the link in a presentation, and/or the like.

Accordingly, for example, link searching application 110 can search the Internet 102 for the link text (e.g., at least a portion of the URL) of one or more generated links to identify potential publication thereof where results are returned with content that includes at least the portion of the URL. In an example, link searching application 110 can automatically take one or more remedial actions based on identifying one or more links in the web search, such as temporarily deactivating the link, generating a report of identified links, and/or the like. In an example, reporting component 116 can send the report to another computing device 126 in the organization 120, such as a computing device or associated account of an administrator. Computing device 126 may include or instantiate (e.g., via a webpage, application, etc. that communicates back to the link searching application) a report interfacing component 128 to view the report, deactivate links, reactivate deactivated links, delete links, modify links, etc.

In examples where the link searching application 110 automatically performs a remedial action of at least temporarily deactivating the link, the security of the data is improved. Whilst the link is deactivated, anyone who has been sent the link can no longer access the private file to which the link related. In various examples, the deactivation of the link may be permanent.

FIG. 2 is a flowchart of an example of a method 200 for searching for publication of private links to files. For example, method 200 can be performed by the computing device 100, and is accordingly described with reference to FIG. 1, as a non-limiting example of an environment for carrying out method 200.

In method 200, optionally at action 202, a request to generate one or more links to one or more files can be received. In an example, link generating component 118, e.g., in conjunction with processor 104, memory 106, etc., can receive the request to generate the one or more links to the one or more files. For example, link generating component 118 can receive the request from a productivity application 124, as described, to create a link to the file. In one example, the productivity application 124 can request the link for sending to another user in an electronic mail or other communication. For example, the productivity application 124 may include a plug-in that allows for creation of the link by communicating with link generating component 118 to create the link (e.g., URL) to the file. As described, the file can be stored in a distributed or remote storage (e.g., cloud storage), and the link can be a link to access the file from the distributed or remote storage. In addition, in an example, the request for the link may include a level of sensitivity of the file, of the request, of the recipient, of the communication, etc.

In method 200, optionally at action 204, one or more links to one or more files can be generated and stored. In an example, link generating component 118, e.g., in conjunction with processor 104, memory 106, etc., can generate and store the one or more links to the one or more files. For example, link generating component 118 can generate a link to a file as a URL, as described, which may include one or more parameters allowing a computing device that manages the file to determine which file is being requested. The link can include other identifying information as well, and may be encoded or encrypted to provide a level of authenticity and/or security to the link. Link generating component 118 can store the link as well, and may store other information related to the link, such as a level of sensitivity, if specified, an organization to which the file and link relate, etc. In one example, link generating component 118 may create separate lists of links for given organizations (e.g., organization 120).

In method 200, optionally at action 206, occurrence of an event can be detected or an on-demand request can be received. In an example, link searching application 110, e.g., in conjunction with processor 104, memory 106, etc., can detect occurrence of the event or receive the on-demand request. For example, link searching application 110 can detect the occurrence of the event of receive the on-demand request for the purpose of searching the Internet 102 for one or more links. In an example, the event can relate to a periodic timer such that link searching application 110 can manage the timer and can perform a search for links each time the timer expires. In another example, the event can relate to detected creation of a new link or accessing of the link. In yet another example, link searching application 110 can receive an on-demand request (e.g., from a report interfacing component 128) to search for one or more links and/or report if the one or more links are found.

In method 200, at action 208, a list of one or more links created for providing access to one or more files can be obtained. In an example, link obtaining component 112, e.g., in conjunction with processor 104, memory 106, link searching application 110, etc., can obtain the list of one or more links created for providing access to one or more files. For example, link obtaining component 112 may begin to obtain the list based on the detected event or received on-demand request. In addition, for example, link obtaining component 112 may obtain the list of one or more links from the link generating component 118. As described, for example, separate lists can be created for each organization, and link obtaining component 112 can obtain lists of links for given organizations using aspects described herein. Moreover, in an example, link obtaining component 112 can obtain the list of one or more links based on a specified level of sensitivity. For example, some links may not be sensitive (or may have a level of sensitivity that is under a threshold, etc.), and thus whether the link is published may not be of concern.

In one example, the list of one or more links can include all links created by users within the organization that are at least at a threshold sensitivity level. In another example, the list of one or more links can be determined as links that are not longer than a certain time in age (e.g., creation date/time for the link is less than a threshold period of time from a current date/time). Moreover, for example, the list of one or more links can be determined as links that are still valid, are associated with a file that still exists in cloud storage, and/or the like. Thus, for example, link obtaining component 112 can receive the one or more links in a list and/or according to one or more of the additional parameters described above (and/or similar parameters). In one example, link generating component 118 can generate the list(s) of links based on the one or more parameters, and link obtaining component 112 can receive the generated list(s) from link generating component 118. In one example, link obtaining component 112 can query link generating component 118 for a list of links based on specified parameters (e.g., organization, user account, sensitivity level, age, etc.), and can receive the list of one or more links therefrom. In one example, link searching application 110 may receive the parameters in an on-demand request.

In method 200, at action 210, a web search can be performed, for at least one link of the one or more links, for a string that is at least a portion of the at least one link. In an example, web searching component 114, e.g., in conjunction with processor 104, memory 106, link searching application 110, etc., can perform, for at least one link of the one or more links, the web search for the string that is at least a portion of the at least one link. For example, the string can be at least a portion of the URL (e.g., the whole URL, the URL without "https://," an encrypted portion of the URL, and/or the like). For example, web searching component 114 can use a search engine, e.g., via an application programming interface (API) or other interface provided by the search engine, to search the Internet 102 for the string of the link (e.g., for each of the one or more links in the list).

In method 200, at action 212, results of the web search can be analyzed to determine whether at least the portion of the at least one link is located in the web search. In an example, web searching component 114, e.g., in conjunction with processor 104, memory 106, link searching application 110, etc., can analyze the results of the web search to determine whether at least the portion of the at least one link is located in the web search. For example, in performing the web search, web searching component 114 can receive a response that may indicate a list of zero or more results, where the results may include web pages on the WWW or other published content. For example, the results may indicate another link or URL to the content identified in the results, which may include at least the portion of the string corresponding to the one or more links (e.g., URLs) obtained by link obtaining component 112. In one example, web searching component 114 may consider web search results as definitive publication of the corresponding link. In another example, web searching component 114 can review content of one or more of the results to determine whether the string appears verbatim, whether the string is part of a link, other characters around the string that is searched to determine whether the string is for the link, and/or the like. For example, web searching component 114 may search for an encoded/encrypted text portion of the link, and may determine whether characters near the encoded/encrypted portion are consistent with a link. Where web searching component 114 determines that results with content including the one or more links are returned, reporting component 116 can report the existence of the content that includes the one or more links and/or can take other remedial actions. In one example, the remedial action selected or pursued for the at least one link may be based on a level of sensitivity for the at least one link.

For example, in method 200, optionally at action 214, where at least the portion of the at least one link is located in the web search, a report indicating that the at least one link is located in the web search can be generated. In an example, reporting component 116, e.g., in conjunction with processor 104, memory 106, link searching application 110, etc., can, where at least the portion of the at least one link is located in the web search, generate the report indicating that the at least one link is located in the web search. For example, reporting component 116 can generate the report as a list of one or more of the links (e.g., including the at least one link) that was located in the web search. In one example, reporting component 116 can include information regarding the one or more links, such as a corresponding file to which the link relates, organization information, an author or recipient of the link, etc. Moreover, in an example, reporting component 116 can include options in the report to deactivate the link, generate (and/or send) a new link to the associated file, and/or the like.

Reporting component 116, in an example, can provide the report to another computing device, such as computing device 126 and/or via report interfacing component 128. In this regard, an administrator can review the report and/or determine remedial action to take in view of the one or more links being published. In another example, reporting component 116 may notify an author of the at least one link that the link is published, and the author can attempt to modify or remove the link, etc.

For example, in method 200, optionally at action 216, where at least the portion of the at least one link is located in the web search, the one or more links can be automatically deactivated for at least a period of time. In an example, reporting component 116, e.g., in conjunction with processor 104, memory 106, link searching application 110, etc., can, where at least the portion of the at least one link is located in the web search, automatically deactivate the one or more links for at least the period of time. For example, reporting component 116 can request link generating component 118 to at least temporarily deactivate the link to the file, which can provide improved security and protection for the file by at least temporarily deactivating the link (and thus outside access to) the file. If other links to the same file exist, in one example, reporting component 116 may request deactivation of the additional links as well. In addition, reporting component 116 can indicate deactivation of the link in a generated report and/or can provide an option to reactivate the link, such that a user/administrator viewing the report via report interfacing component 128 may reactivate deactivated links if desired.

In another example, reporting component 116 (e.g., in addition to or as part of deactivating the link) can generate a new link to the file and/or can automatically redistribute the link to recipients (e.g., where the recipients can be indicated in initial generation of the link via link generating component 118, as described in actions 202 and 204). By generating and redistributing a new link to the file, not only is access to the file by via the published private link prevented, thereby improving data security, but the redistribution of the new link improves the ability of the system to distribute data, by enabling authorized users to access the private file. Consequently unauthorized users are automatically blocked from accessing the private file, whilst authorized users can continue to access the private file and this replacement of the link to the private file may be performed in a manner that is invisible to authorized users.

FIG. 3 illustrates an example of computing device 100 (and/or computing devices 122, 126) including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as link searching application 110, and/or components thereof, as described herein, and/or other components of the computing device 100.

Further, computing device 100 may include a communications component 302 that provides for establishing and maintaining communications with one or more other devices, parties, entities, etc. utilizing hardware, software, and services as described herein. Communications component 302 may carry communications between components on computing device 100, as well as between computing device 100 and external devices, such as devices located across a communications network and/or devices serially or locally connected to computing device 100. For example, communications component 302 may include one or more buses, and may further include transmit chain components and receive chain components associated with a wireless or wired transmitter and receiver, respectively, operable for interfacing with external devices. Communications component 302 may be used to couple computing device 100 with Internet 102. Moreover, for example, communications component 302 can carry communications between link searching application 110, can provide access to remotely stored files, etc.

Additionally, computing device 100 may include a data store 304, which can be any suitable combination of hardware and/or software, that provides for mass storage of information, databases, and programs employed in connection with examples described herein. For example, data store 304 may be or may include a data repository for applications and/or related parameters not currently being executed by processor 104. In addition, data store 304 may be a data repository for an operating system, application, such as link searching application 110, and/or components thereof, etc.

executing on the processor 104, and/or one or more other components of the computing device 100.

Computing device 100 may also include a user interface component 306 operable to receive inputs from a user of computing device 100 and further operable to generate outputs for presentation to the user (e.g., an interface of productivity application 124, report interfacing component 128, etc.). User interface component 306 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 306 may include one or more output devices, a speaker, a haptic feedback mechanism, a printer, any other mechanism capable of presenting an output to a user, or any combination thereof.

Computing device 100 can also include a link searching application 110 for searching for one or more links using web search and reporting any results returned from web content that include text of the one or more links.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for detecting published links, comprising:
   obtaining a list of one or more links sent in a communication within a network of an organization and created for providing access within the network of the organization to one or more files in a cloud storage, wherein the one or more links are of a universal resource locator (URL) format;
   performing a web search for published web pages outside of the network of the organization that include at least a portion of the URL format of the one or more links;
   analyzing results of the web search to determine whether at least the portion of the URL format of the one or more links is located; and
   where at least the portion of the URL format of the one or more links is located in the web search, generating a report indicating that the one or more links are located in the web search.

2. The computer-implemented method of claim 1, further comprising:
   receiving a request to generate the one or more links to the one or more files;
   generating, based on the request, the one or more links to the one or more files; and
   storing the one or more links in the list.

3. The computer-implemented method of claim 1, wherein the one or more links are created for sharing via electronic mail communications within the network of the organization.

4. The computer-implemented method of claim 1, wherein analyzing the results of the web search comprises determining whether text of at least the portion of the URL format of the one or more links is within content of one or more web pages returned in the web search.

5. The computer-implemented method of claim 1, further comprising detecting occurrence of an event, wherein at least one of obtaining the list of one or more links, performing the web search, analyzing the results, or generating the report, are performed based on the occurrence of the event.

6. The computer-implemented method of claim 5, wherein the event relates to detecting expiration of a timer.

7. The computer-implemented method of claim 1, where at least the portion of the URL format of the one or more links is located in the web search further comprising temporarily deactivating the one or more links for at least a period of time.

8. The computer-implemented method of claim 7, wherein the report includes an option to reactivate the one or more links.

9. The computer-implemented method of claim 7, wherein the report includes an option to replace the one or more links to the one or more files.

10. A computing device for detecting published links, comprising:
- a memory storing a list of one or more links sent in a communication within a network of an organization and created for providing access within the network of the organization to one or more files in a cloud storage, wherein the one or more links are of a universal resource locator (URL) format; and
- at least one processor coupled to the memory, wherein the at least one processor is configured to:
  - obtain the list of one or more links;
  - perform a web search for published web pages outside of the network of the organization that include at least a portion of the URL format of the one or more links;
  - analyze results of the web search to determine whether at least the portion of the URL format of the one or more links is located; and
  - where at least the portion of the URL format of the one or more links is located in the web search, generate a report indicating that the one or more links are located in the web search.

11. The computing device of claim 10, wherein the at least one processor is further configured to:
- receive a request to generate the one or more links to the one or more files;
- generate, based on the request, the one or more links to the one or more files; and
- store the one or more links in the list.

12. The computing device of claim 10, wherein the one or more links are created for sharing via electronic mail communications within the network of the organization.

13. The computing device of claim 10, wherein the at least one processor is configured to analyze the results of the web search at least in part by determining whether text of at least the portion of the URL format of the one or more links is within content of one or more web pages returned in the web search.

14. The computing device of claim 10, wherein the at least one processor is further configured to detect occurrence of an event, wherein the at least one processor is configured to at least one of obtain the list of one or more links, perform the web search, analyze the results, or generate the report, based on the occurrence of the event.

15. The computing device of claim 14, wherein the event relates to detecting expiration of a timer.

16. The computing device of claim 10, where at least the portion of the URL format of the one or more links is located in the web search the at least one processor is further configured to temporarily deactivate the one or more links for at least a period of time.

17. The computing device of claim 16, wherein the report includes an option to reactivate the one or more links.

18. The computing device of claim 16, wherein the report includes an option to replace the one or more links to the one or more files.

19. A non-transitory computer-readable medium, comprising code executable by one or more processors for detecting published links, the code comprising code for:
- obtaining a list of one or more links sent in a communication within a network of an organization and created for providing access within the network of the organization to one or more files in a cloud storage, wherein the one or more links are of a universal resource locator (URL) format;
- performing a web search for published web pages outside of the network of the organization that include at least a portion of the URL format of the one or more links;
- analyzing results of the web search to determine whether at least the portion of the URL format of the one or more links is located; and
- where at least the portion of the URL format of the one or more links is located in the web search, generating a report indicating that the one or more links are located in the web search.

20. The non-transitory computer-readable medium of claim 19, the code further comprising code for:
- receiving a request to generate the one or more links to the one or more files;
- generating, based on the request, the one or more links to the one or more files; and
- storing the one or more links in the list.

* * * * *